United States Patent
Chan

(10) Patent No.: US 10,254,007 B2
(45) Date of Patent: Apr. 9, 2019

(54) ENERGY TRANSMISSION SYSTEM AND A COOKING VESSEL

(71) Applicant: Samtech Limited, Kowloon (HK)

(72) Inventor: Sai Fai Chan, Kowloon (HK)

(73) Assignee: Samtech Limited, Kowloon (HK)

( * ) Notice: Subject to any disclaimer, the term of this patent is extended or adjusted under 35 U.S.C. 154(b) by 0 days.

(21) Appl. No.: 15/101,624

(22) PCT Filed: Dec. 3, 2014

(86) PCT No.: PCT/CN2014/092896
§ 371 (c)(1),
(2) Date: Jun. 3, 2016

(87) PCT Pub. No.: WO2015/081859
PCT Pub. Date: Jun. 11, 2015

(65) Prior Publication Data
US 2016/0298873 A1    Oct. 13, 2016

(30) Foreign Application Priority Data

Dec. 3, 2013 (HK) .................................. 13113461.8

(51) Int. Cl.
*F22B 1/28* (2006.01)
*F24H 4/02* (2006.01)
(Continued)

(52) U.S. Cl.
CPC ................ *F24H 4/02* (2013.01); *A47J 27/04* (2013.01); *A47J 27/16* (2013.01); *A47J 36/20* (2013.01);
(Continued)

(58) Field of Classification Search
CPC ... F22B 1/28; F25B 30/02; A47J 36/20; A47J 27/16; A47J 27/04; F22D 11/06; F24H 4/02; Y02B 30/12; Y02P 60/831
(Continued)

(56) References Cited

U.S. PATENT DOCUMENTS 4,608,731 A * 9/1986 Holly ....................... A22C 7/00
426/513
5,072,663 A * 12/1991 Ellis-Brown ........ A23B 4/0053
198/860.5

(Continued)

FOREIGN PATENT DOCUMENTS

CN    201157700 Y    12/2008
CN    201166494 Y    12/2008
(Continued)

OTHER PUBLICATIONS

Translation of CN101520256 to Jianjun, Ling.*
(Continued)

*Primary Examiner* — Ana M Vazquez
(74) *Attorney, Agent, or Firm* — Brown Rudnick LLP; Adam M. Schoen, Esq.

(57) ABSTRACT

An energy transmission system for exchanging thermal energy of a medium in a sealed loop with a compressor, a control valve, and two heat exchangers between the compressor and the control valve such that a medium flowing between the compressor and the control valve absorbs thermal energy from one heat exchanger and releases thermal energy through the other heat exchanger. The compressor (22) changes the pressure of the medium in the loop such that the pressure through one heat exchanger is different from the pressure through the other heat exchanger, and the physical state of the medium is different between regions of the sealed loop.

13 Claims, 6 Drawing Sheets

(51) Int. Cl.
*A47J 27/16* (2006.01)
*F22D 11/06* (2006.01)
*F25B 30/02* (2006.01)
*A47J 36/20* (2006.01)
*A47J 27/04* (2006.01)

(52) U.S. Cl.
CPC ............... *F22B 1/28* (2013.01); *F22D 11/06* (2013.01); *F25B 30/02* (2013.01); *Y02B 30/12* (2013.01); *Y02P 60/831* (2015.11)

(58) Field of Classification Search
USPC ...................................................... 62/324.1
See application file for complete search history.

(56) References Cited

U.S. PATENT DOCUMENTS

| | | | | |
|---|---|---|---|---|
| 5,098,332 A | * | 3/1992 | Handel | ................ A22C 11/001 |
| | | | | 425/513 |
| 5,275,094 A | * | 1/1994 | Naft | ........................ A47J 36/20 |
| | | | | 126/369 |
| 5,509,274 A | * | 4/1996 | Lackstrom | ............... E04H 4/129 |
| | | | | 237/2 B |
| 5,592,871 A | * | 1/1997 | Bartlett | ............... A47J 37/0763 |
| | | | | 126/273.5 |
| 6,007,327 A | * | 12/1999 | Morbitzer | ............... F24C 3/103 |
| | | | | 126/39 BA |
| 2002/0020405 A1 | * | 2/2002 | Coleman | ............. A47J 37/0682 |
| | | | | 126/41 R |
| 2002/0189603 A1 | * | 12/2002 | Hsu | .......................... F01L 1/34 |
| | | | | 123/673 |
| 2003/0034025 A1 | * | 2/2003 | Williams | ............ A47J 37/0763 |
| | | | | 126/41 R |
| 2006/0172096 A1 | * | 8/2006 | Kyle | ........................ B32B 1/02 |
| | | | | 428/35.2 |
| 2008/0314258 A1 | * | 12/2008 | Martin | .................. A47J 27/004 |
| | | | | 99/329 R |

FOREIGN PATENT DOCUMENTS

| | | |
|---|---|---|
| CN | 101518692 A | 9/2009 |
| CN | 101520256 A | 9/2009 |
| CN | 102715827 A | 10/2012 |
| CN | 202681613 U | 1/2013 |
| HK | 1191507 A2 | 7/2014 |
| KR | 20100122325 A | 11/2010 |

OTHER PUBLICATIONS

Translation CN 102715827 to Cao et al.*
International Search Report dated Mar. 10, 2015 for International Application No. PCT/CN2014/092896 (3 Pages).

* cited by examiner

ENERGY TRANSMISSION SYSTEM AND A COOKING VESSEL

TECHNICAL FIELD

The present invention relates to a liquid heating apparatus, and in particular, to a liquid heating apparatus with a heat pump.

BACKGROUND

During daily life, people always heat liquid (for example, water) to achieve various objectives. For example, during cooking, water is heated to be boiling so as to blanch food, or water is heated to generate vapor to steam food. During manufacturing of distilled water, water is heated to generate vapour, and the vapor is then condensed into distilled water. During power generation, water is heated to generate vapour, so as to push a turbine to generate electricity.

In the above examples, the vapor generated during heating still contains a large amount of heat, especially latent heat absorbed during vaporation. Among common liquids, water has the highest latent heat of vaporation being up to 2250 KJ/Kg. People have been trying to recycle or utilize heat energy in vapour. For example, Chinese Patent Application No. 200810081952.5 discloses a "high-efficiency energy-saving steamer" which may recycle the heat energy of the steam generated during steaming with "high-temperature high-pressure refrigerant" through "multi-source heat pump". However, such disclosure is subjected to the following shortcomings:

1. The "high-temperature high-pressure refrigerant" compressor is limited to high pressure operation which gives a high energy consuming process with poor recycling efficiency and the compressor is fragile to wearing.

2. The "high-temperature high-pressure refrigerant" is expensive and poses harmful threat to the environment.

3. The multi-source heat pump" for heat absorption is bulky and not suitable for household applications.

SUMMARY

According to a first broad form of the present invention, there is provided an energy transmission system for exchanging thermal energy of a medium in a sealed loop, the energy transmission system may comprising a compressor having a first end and a second end, a control valve having a first end and a second end for controlling the flow of the medium in the sealed loop of the energy transmission system, a first passageway extending from the first end of the compressor to the first end of the control valve, at least one portion of the first passageway configured to form a first heat exchanger such that a medium flowing therein absorbs thermal energy, and a second passageway extending from the second end of the compressor to the second end of the control valve, at least one portion of the second passageway configured to form a second heat exchanger for releasing thermal energy of the medium flowing therein, wherein the compressor is configured for changing the pressure of at least one portion of the medium in the first and second passageway such that the pressure in at least one portion of the first passageway is different from the pressure in at least one portion of the second passageway, and the physical state of the medium is different between regions of the sealed loop.

Preferably, at least one portion of the medium changes from gas state to liquid state in the second heat exchanger, and at least one portion of the medium changes from liquid state to gas state in the first heat exchanger.

Optionally, the medium may be water.

Advantageously, the compressor and the control valve may be configured for maintaining the pressure slightly above one standard atmosphere pressure within the second passageway and the pressure slightly below one standard atmosphere pressure within the first passageway.

Preferably, the energy transmission system may further comprise a first chamber comprising a further medium therein, at least one portion of the further medium in the first chamber communicating thermal energy with the medium in the second heat exchanger and changing its physical state, a second chamber receiving the further medium which has changed the physical state in the first chamber, at least one portion of the further medium in the second chamber communicating thermal energy with the medium in the first heat exchanger and changing its physical state.

Advantageously, the boiling point of the further medium in the first chamber is slightly lower than the boiling point of the medium in the second heat exchanger, and the boiling point of the further medium in the second chamber is slightly higher than the boiling point of the medium in the first heat exchanger.

Optionally, the energy transmission system may further comprise a third chamber receiving the further medium from the second chamber, a third heat exchanger connected to the first chamber via a passageway, wherein the further medium flowing through the third chamber communicates thermal energy with the further medium in the third heat exchanger.

Optionally, the energy transmission system further comprises a fourth chamber receiving the further medium from the second chamber or the third chamber.

Advantageously, the fourth chamber may be connected with the first chamber and introduces the further medium into the first chamber.

Optionally, the energy transmission system may further comprise a generator located between the first chamber and the second chamber, the generator generating electricity by utilizing the flow of the further medium from the first chamber to the second chamber.

Optionally, the energy transmission system may further comprise a fifth chamber removably located between the first chamber and the second chamber, the fifth chamber configured for accommodating articles which exchanges thermal energy with the further medium flowing therethrough.

Advantageously, the fifth chamber may comprise a sealing cover and at least one container, the sealing cover configured for sealingly covering the at least one the container, the container comprising at least a first chamber and a second chamber, the first chamber comprising a bracket with porous structure and partition wall surrounding the bracket, the bracket having porous structure which allows the further medium flowing through, the second chamber and the first chamber separated by the partition wall, the second chamber comprising cavity which forms a passage for exporting the further medium.

According to a second broad form of the present invention, there is provided a cooking vessel, comprising at least one container, the container comprising at least a first chamber and a second chamber, the first chamber comprising a bracket and partition wall surrounding the bracket, the bracket having porous structure which allows a medium flowing through, the second chamber and the first chamber separated by the partition wall, the second chamber comprising cavity which forms a passage for exporting the medium.

Preferably, the cooking vessel may further comprising a sealing cover, the sealing cover configured for sealingly covering the at least one the container.

Preferably, the cooking vessel may further comprising further comprising a plurality of containers which are stacked together, wherein the first chamber and the second chamber of any one of the containers are in contact with the first chamber and the second chamber of an adjacent container to form a sealed passageway for the medium.

An objective of the present invention is to provide a liquid heating apparatus with a heat pump, which can recycle or utilize heat energy in exhausted vapour, thereby saving the power consumption.

BRIEF DESCRIPTION OF DRAWINGS

The forgoing fundamental structure of the present disclosure will be more apparent from the following detailed description and drawings of illustrative embodiments of the invention.

DETAILED DESCRIPTION

Figure 1:
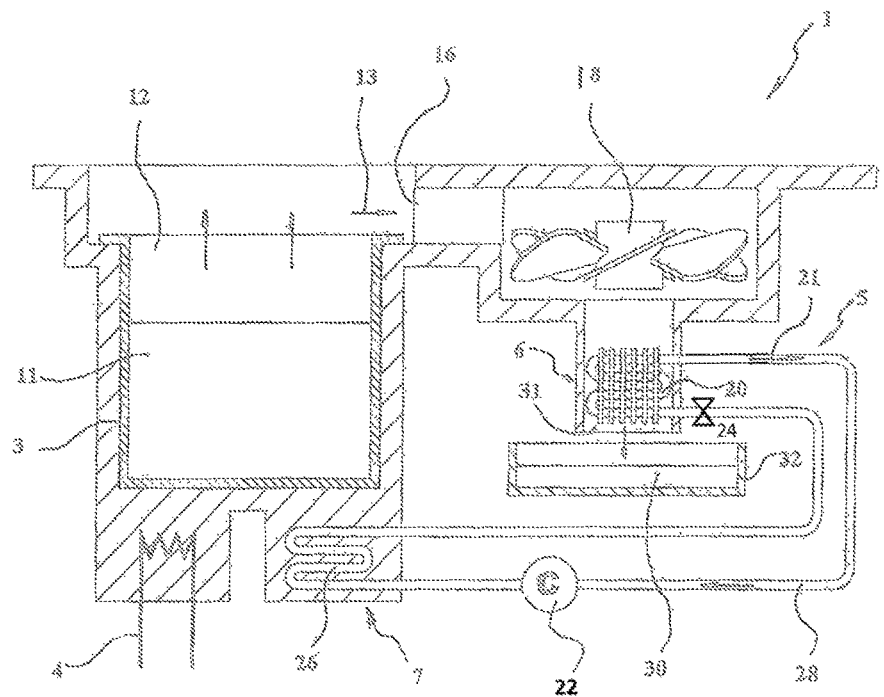
FIG. 1 is a schematic structural diagram of a first embodiment of a liquid heating apparatus according to the present invention illustrating when the liquid heating apparatus is applied to a situation such as a cooking apparatus.

Various embodiments of a liquid heating apparatus according to the present invention are described merely through examples with reference to the accompanying drawings. It should be understood that, the present invention is not limited thereto. In the drawings, the same components use the same reference numerals.

FIG. 1 shows a structure of a first embodiment of a liquid heating apparatus. A cooking apparatus used in a restaurant to cook hot water blanching foods such as noodles is illustrated as an example for explanation. In this type of restaurant, a pot of boiling water must be always kept in order that hot cooked food can be ready for serving quickly. During the boiling process of hot water, vapor keeps bringing heat energy away and therefore the hot water needs to be continuously heated to keep boiling. However, this practice not only causes energy waste, but also leads to extremely hot environment within the kitchen.

As shown in FIG. 1, a cooking apparatus 1 includes a container 3, a heater 4, a heat pump 5, a first heat exchanger 6, a second heat exchanger 7, and a fluid conveying apparatus (for example, a vapor inhalation apparatus) 18. The container 3 is used to accommodate liquid (for example, water) 11, and an opening 12 is disposed at an upper part of the container 3, so as to place noodles (not shown in the figure) and the like into the liquid 11 in the container 3 or withdraw the noodles or the like from liquid 11 in the container 3. The heater 4 is disposed at the bottom or periphery of the container 3 for heating the liquid 11 in the container 3 to boiling, so as to cook food. Vapor 13 generated by the boiling liquid 11 is inhaled by the fluid conveying apparatus (for example, an exhaust fan) 18 from an inlet 16 adjacent to the opening 12 of the container, and is conveyed to the first heat exchanger 6, so as to perform heat exchange with working fluid 21 within an evaporator 20 of the heat pump 5. The heat pump 5 is a compression heat pump, and includes an evaporator 20, a compressor 22, a control valve 24 and a condenser 26 which are connected by using a sealing pipeline 28, and the working fluid 21 in the heat pump is water. The control valve 24 is used to limit the flow of the working fluid 21 entering the evaporator 20. The compressor 22 takes the working fluid 21 in the evaporator 20 out, so that the pressure in the evaporator 20 is reduced, and the boiling point of the working fluid 21 is slightly lower than the temperature of the vapor 13 entering the first heat exchanger 6. The vapor 13 is condensed in the first heat exchanger 6 to release latent heat thereof. The heat energy is absorbed by the working fluid 21 in the evaporator 20 through the first heat exchanger 6, so that the working fluid is vaporized. The vaporized working fluid 21 is compressed within the between the compressor 22 and the control valve 24 (the second channel) by the functions of the compressor 22 and the control valve 24, such that the pressure of the working fluid 21 is increased until its boiling point is slightly above the boiling point of the liquid 11 within the container 3. A small portion of the working fluid within the second channel is condensed due to the pressurization and thus releases its latent heat. Such released latent heat is used for heating up the rest of the large portion of the uncondensed working fluid until its temperature reaches the temperature of increased boiling point (slightly above the boiling point of the liquid 11 within the container 3). The working fluid introduced into the condenser 26 is mainly vapor with a temperature slightly higher than the boiling point of the liquid 11 within the container 3. The second heat exchanger 7 is disposed at the bottom of the container 3 and is in thermal contact with the container 3, so that the heat energy can be conducted to the container 3 to vaporize the liquid 11 in the container through the second heat exchanger 7, and the working fluid 21 is cooled so as to be condensed into liquid. The latent heat released by the working fluid 21 during condensation is absorbed by the liquid 11 as the latent heat of vaporation of the liquid 11. Once the heat pump 5 is in function, the electric energy supplied to the heater 4 may be reduced properly to reduce the power consumption. The vapor 13 is condensed by the first heat exchanger 6 into liquid water 30 and flows out from an outlet 31. The liquid water still contains high amount of heat, and can be stored in a storage 32 for other purposes such as washing. After being used for a period of time, the container 3 is inevitably contaminated by food residue. In this case, a user may take the whole container 3 out for washing to keep clean.

Figure 2:
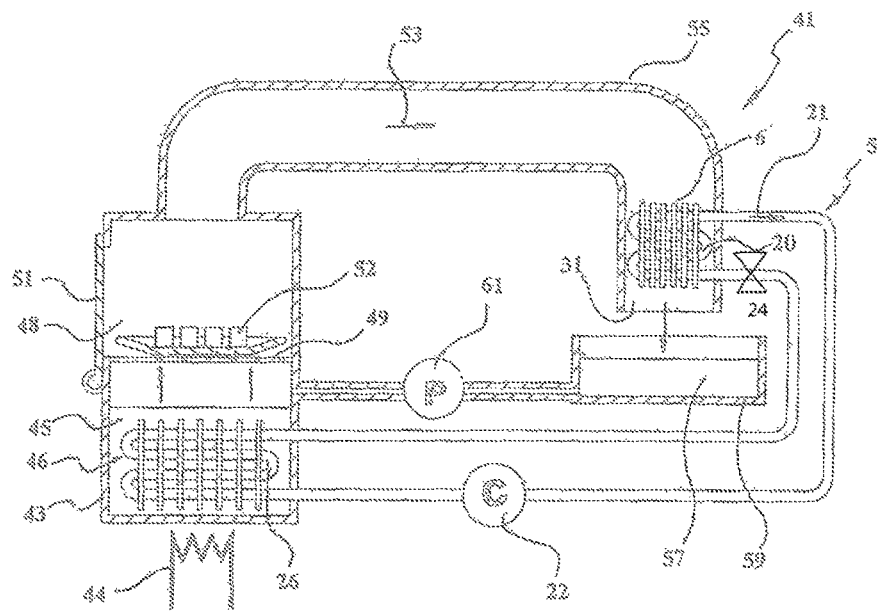
FIG. 2 is a schematic structural diagram of a second embodiment of a liquid heating apparatus according to the present invention illustrating when the liquid heating apparatus is applied to a situation such as a steam cooking apparatus.

FIG. 2 shows a structure of a second embodiment of a liquid heating apparatus according to the present invention. A steam cooking apparatus in a Chinese restaurant to steam food, such as seafood, is illustrated as an example below for explanation.

As shown in FIG. 2, a steam cooking apparatus 41 includes a container 43, a heater 44, a heat pump 5, a first heat exchanger 6, a second heat exchanger 46, and a vapor chamber 48. The container 43 is used to accommodate clean water 45, and a vapor chamber 48 is disposed above the container 43. A support frame 49 is disposed between the vapor chamber 48 and the container 43, and a switch door 51 or a drawer (not shown in the figure) is further disposed on a side wall of the vapor chamber 48, so that a user can place food 52, such as seafood, into the vapor chamber 48, or withdraw food from the vapor chamber 48 through the switch door 51 or drawer. A heater 44 is provided at the bottom or periphery of the container 43 for heating the clean water 45 in the container 43 until boiling, so as to generate vapor 53 to steam the food 52 in the vapor chamber 48. A pipeline 55 is disposed above the container 43, so as to convey excessive vapor 53 to the first heat exchanger 6, thereby performing heat exchange with working fluid 21 in an evaporator 20 of the heat pump 5. The heat pump 5 includes an evaporator 20, a compressor 22, a control valve 24, and a condenser 26. In this embodiment, the structure and working process of the heat pump 5 are the same as those of the first embodiment shown in FIG. 1, and detailed descriptions thereof are omitted herein. The second heat exchanger 46 is disposed in the clean water 45 of the container 43, and heat energy can be transmitted to the clean water 45 in the container 43 through the second heat exchanger 46, so as to vaporize the clean water. The vapor 53 is condensed by the first heat exchanger 6 into water droplets and flows out from an outlet 31 as high-temperature clean water 57 and can be stored in a storage 59. The storage 59 is in communication with the container 43 through a water pump 61 to reintroduce the high-temperature clean water 57 into the container 43, thereby reducing water consumption and power consumption.

The compressor in the present invention can recycle huge latent heat in vapor by minimal work done. By using the steam cooking apparatus in the second embodiment (FIG. 2) as an example, the temperatures of the boiling clean water 45 and the vapor 53 are both 100° C., and in direct contact with the first heat exchanger 6 and the second heat exchanger 46 respectively, so that the working fluid (water) in the evaporator 20 and the condenser 26 passing through the first and second heat exchangers are naturally at 100° C. The compressor 22 only needs to slightly deviate the boiling point from 100° C., and the system can operate normally. For example, the boiling water of water under the pressure of 0.9 BAR is 96.71° C.; and the boiling water of water under the pressure of 1.2 BAR is 104.81° C. As such circumstance, the compressor 22 only needs to keep the pressures in the condenser 26 and the evaporator 20 respectively at 1.2 BAR and 0.9 BAR (that is, to maintain a pressure difference of 0.3 BAR).

In this case, the temperature of the working fluid (mainly vapour) in the condenser 26 is 104.81° C., the working fluid passes through the second heat exchanger 46 and vaporizes the clean water 45 with a boiling point of 100° C. in the container 43. The working fluid is thereby cooled below 104.81° C., and the working fluid is condensed into water under the pressure of 1.2 BAR so as to release latent heat thereof. The heat is absorbed by the clean water 45 to become latent heat of vaporation thereof. After passing through the second heat exchanger 46, the working fluid is mainly liquid water at a temperature not less than 100° C., and then enters the evaporator 20 through the control valve 24. Due to the function of the compressor 22, the pressure in the evaporator 20 is only 0.9 BAR, and the boiling point of the water therein is 96.71° C., so that the liquid water at a temperature of not less than 100° C. is automatically boiled. A small portion of the liquid water is evaporated as vapor and absorbs latent heat from the rest of the liquid water not yet evaporated, such that the remaining liquid water is cooled to 96.71° C. The liquid water at 96.71° C. performs heat exchange with the vapor 53 at the temperature of 100° C. through the first heat exchanger 6, so that the vapor 53 is cooled to be lower than 100° C. and is condensed into liquid water to release latent heat thereof. The heat is absorbed by the liquid water with a boiling point of 96.71° C. in the evaporator 20, so as to vaporize the liquid water. The working fluid 21 (vapor) is then compressed by the compressor 22 to enter the next cycle after passing through the evaporator 20.

The present invention uses water as the working fluid of the heat pump. The volume of one kilogram vapor under the pressure of 0.9 BAR is 1.869 m³; and the volume of one kilogram vapor under the pressure of 1.2 BAR is 1.428 m³. Therefore, in the above example, the work done by the compressor to recycle latent heat of vaporation (2250 KJ/KG) of one kilogram vapor during operation of the present invention is:

$$0.3 \ BAR \times (1.869 - 1.428) \ m^3$$
$$= 30,000 \ N/m^2 \times 0.441 \ m^3$$
$$= 13,230 \ Nm$$
$$= 13,230 \ J$$
$$= 13.23 \ KJ$$

That is, the energy consumption by the compressor is less than 1% of the recycled heat (2250 KJ), which is extremely high efficient. Compared with the prior art of a multi-source heat pump using a high-temperature high-pressure refrigerant, the present invention has the following advantages:

(1) the compressor of the present invention operates under a low pressure, and compared with the prior art using a high-temperature high-pressure refrigerant, the present invention has obviously low requirements on the compressor, such as power, fluid tightness, and maintenance, and is relatively low-cost, energy-saving, and durable;

(2) the present invention uses water as the working fluid, which is much cheaper than the high-temperature high-pressure refrigerant, and is more environmental friendly; and (3) the heat pump of the present invention uses a single heat source with highly centralized heat energy, so that the volume of the heat pump is smaller than the multi-source heat pump in the prior art.

Figure 3:
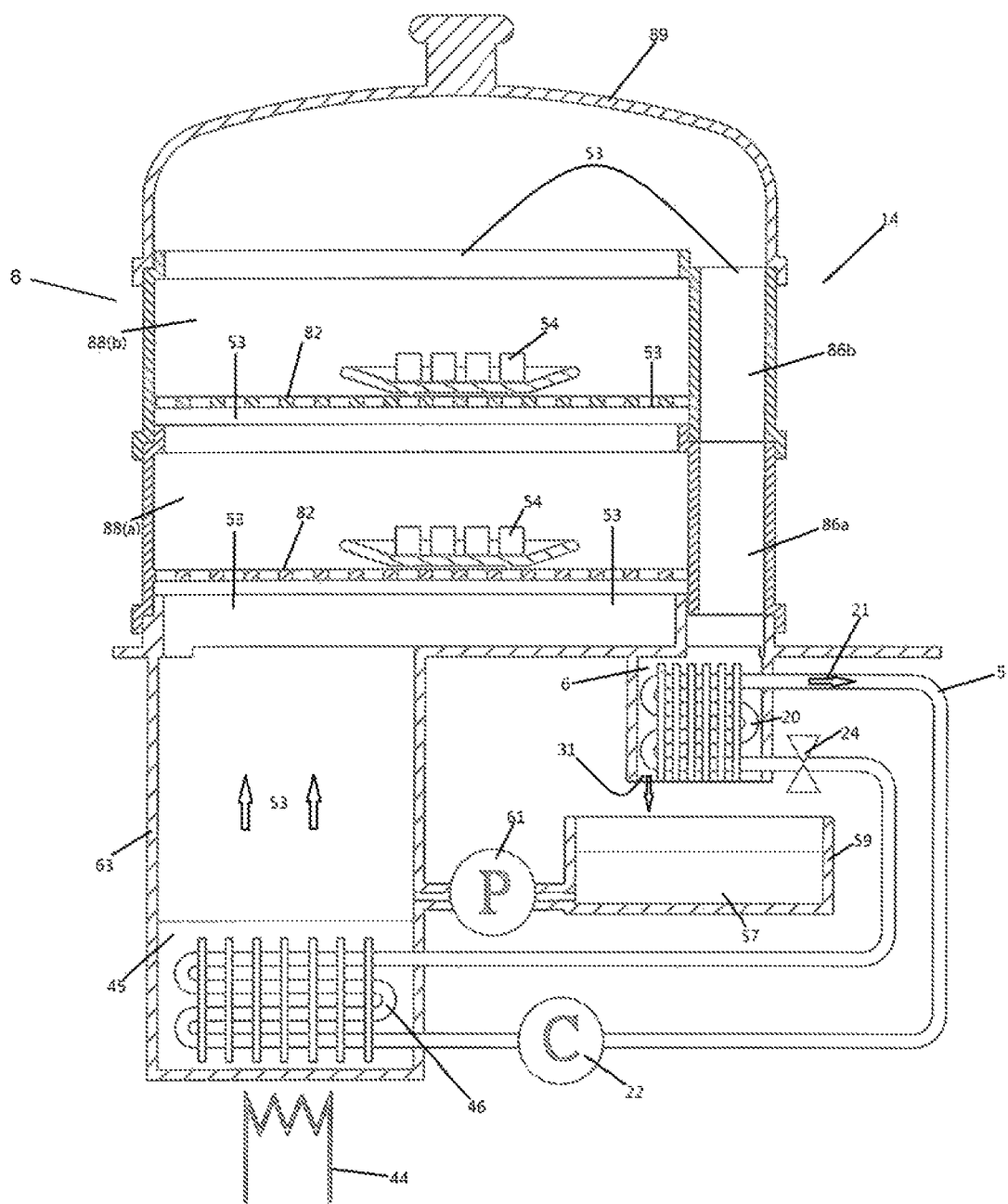
FIG. 3 is a schematic structural diagram of a third embodiment of a liquid heating apparatus according to the present invention illustrating when the liquid heating apparatus is applied to a situation such as a steaming apparatus.
Figure 4:
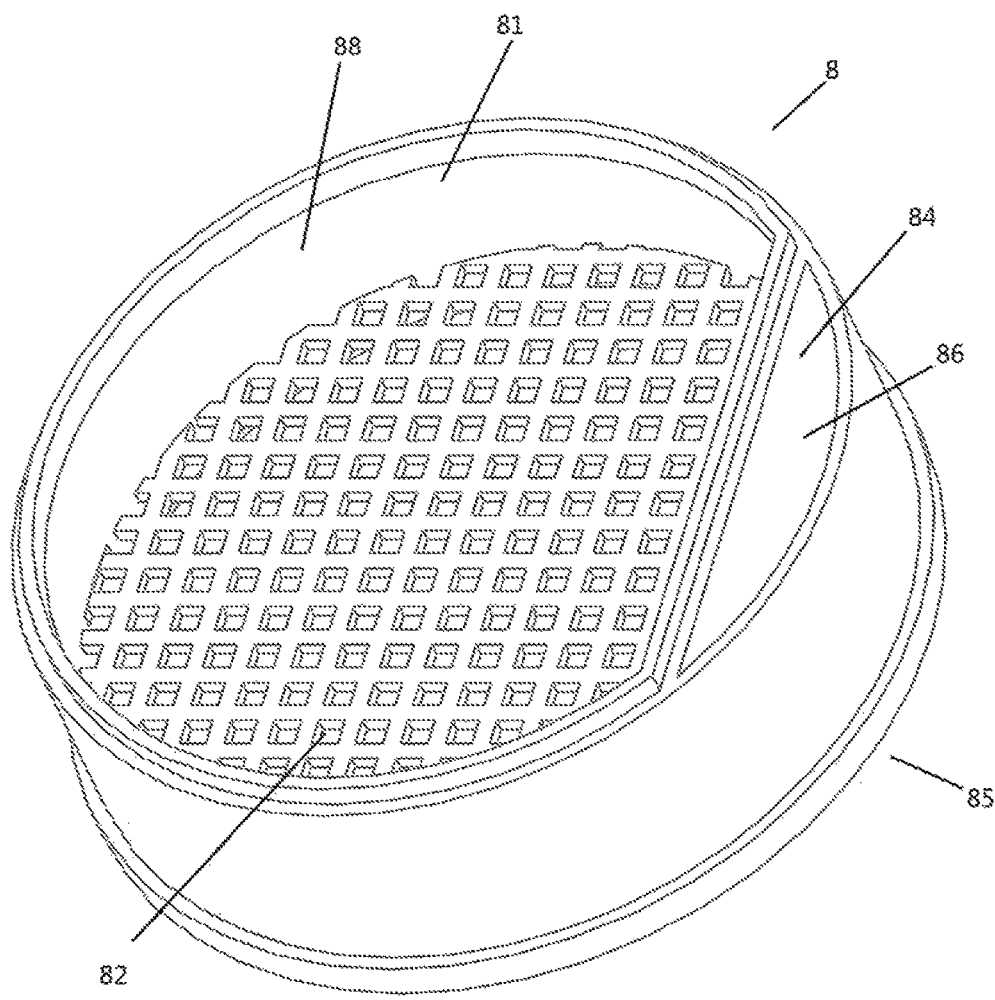
FIG. 4 is a schematic diagram of a vessel of the steaming apparatus of the third embodiment, where the vessel is used to accommodate a steamed object.
Figure 5:
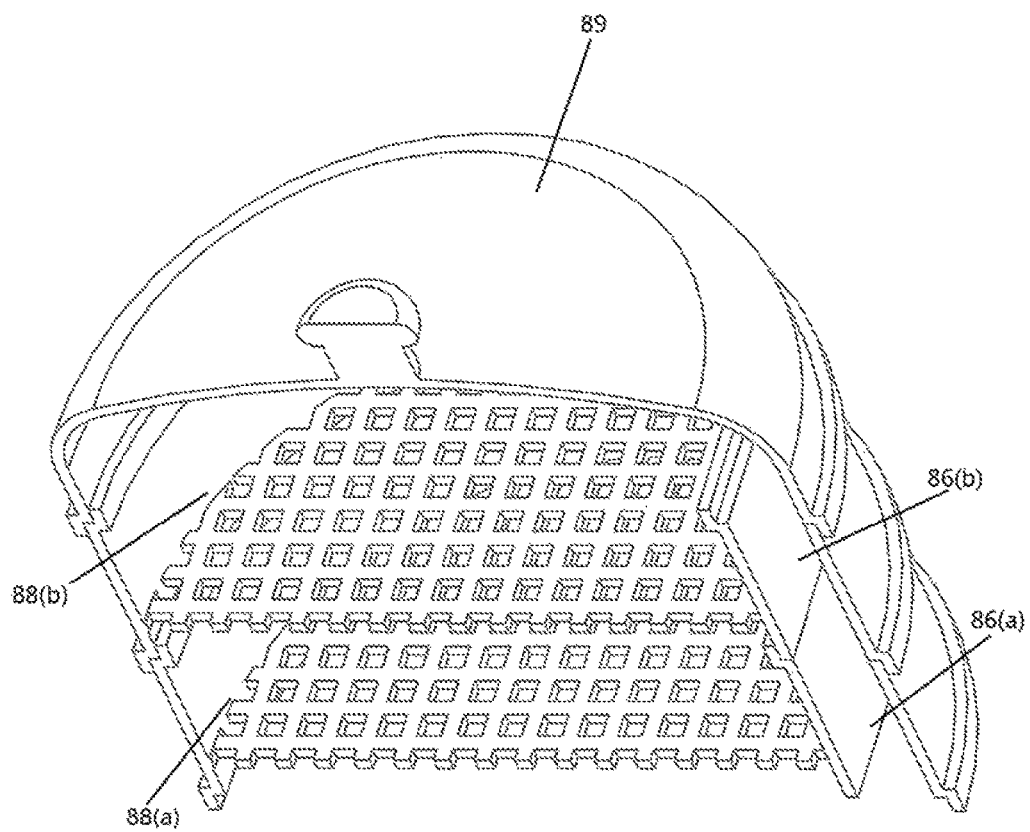
FIG. 5 is a sectional diagram of multiple stacked vessels shown in FIG. 4.

FIG. 3 to FIG. 5 show a structure of a third embodiment of a liquid heating apparatus according to the present invention. A steaming apparatus in a Chinese restaurant to steam food, such as dim sum, is illustrated as an example for explanation. The steaming apparatus may also be used to steam other objects.

As shown in FIG. 3, the steaming apparatus 14 includes a container 63, a heater 44, a heat pump 5, a first heat exchanger 6, a second heat exchanger 46, one or more vessels 8 for accommodating steamed objects (such as desserts), and a top cover 89. The container 63 is used to accommodate clean water 45. The heater 44 is disposed at the bottom or periphery of the container for heating the clean water in the container 63 until boiling, so as to generate vapor 53. The vessel 8 (FIG. 4) is provided with a porous bottom plate 82, a first cavity 88 with an upper opening 81 for accommodating steamed object 52, and a second cavity 86 having an upper opening 84 and a lower opening 85. Multiple vessels 8 may be stacked vertically as shown in FIG. 5, so that the first cavities 88(*a*), 88(*b*) and the second cavities 86(*b*), 86(*a*) of the vessels 8 (8*a* and 8*b*) in sealing communication with each other respectively. As shown in FIG. 3, the vapor 53 generated during boiling enters the first cavities 88(*a*) and 88(*b*) through the porous bottom plate 82 of the vessel 8, so as to steam steamed objects 54 in the first cavities. FIG. 3 merely shows two vessels 8, but a user may stack more vessels accommodating steamed objects 54 during use to improve the efficiency of the steaming work. The vapor 53 is stopped by the top cover 89 at the topmost of the first cavity 88(*b*), and introduced into the second cavities 86(*b*) and 86(*a*) to be fed into the first heat exchanger 6, so as to perform heat exchange with a working fluid 21 in an evaporator 20 of the heat pump 5.

The heat pump 5 includes the evaporator 20, a compressor 22, a control valve 24, and a condenser 26. In this embodiment, the structure and working process of the heat pump 5 are the same as those of the first embodiment shown in FIG. 1, and detailed descriptions thereof are omitted herein. The second heat exchanger 46 is disposed in the clean water 45 of the container 63, and heat energy can be transmitted to the clean water 45 in the container 63 through the second heat exchanger 46, so as to vaporize the clean water. The vapor 53 is condensed by the first heat exchanger 6 into water droplets and flows out from an outlet 31 as high-temperature clean water 57, and can be stored in a storage 59. The storage 59 is in communication with the container 63 through a water pump 61 for reintroducing the high-temperature clean water 57 into the container 63, thereby reducing water consumption and power consumption In the above example, a fluid conveyer 18 as illustrated in the first embodiment (not shown in the figure) may be disposed between the second cavity 86(*a*) of the bottommost vessel 8 and the first heat exchanger 6 or between the first cavity 88(*a*) of the bottommost vessel 8 and the container 63, so as to accelerate flowing of the vapour.

Figure 6:
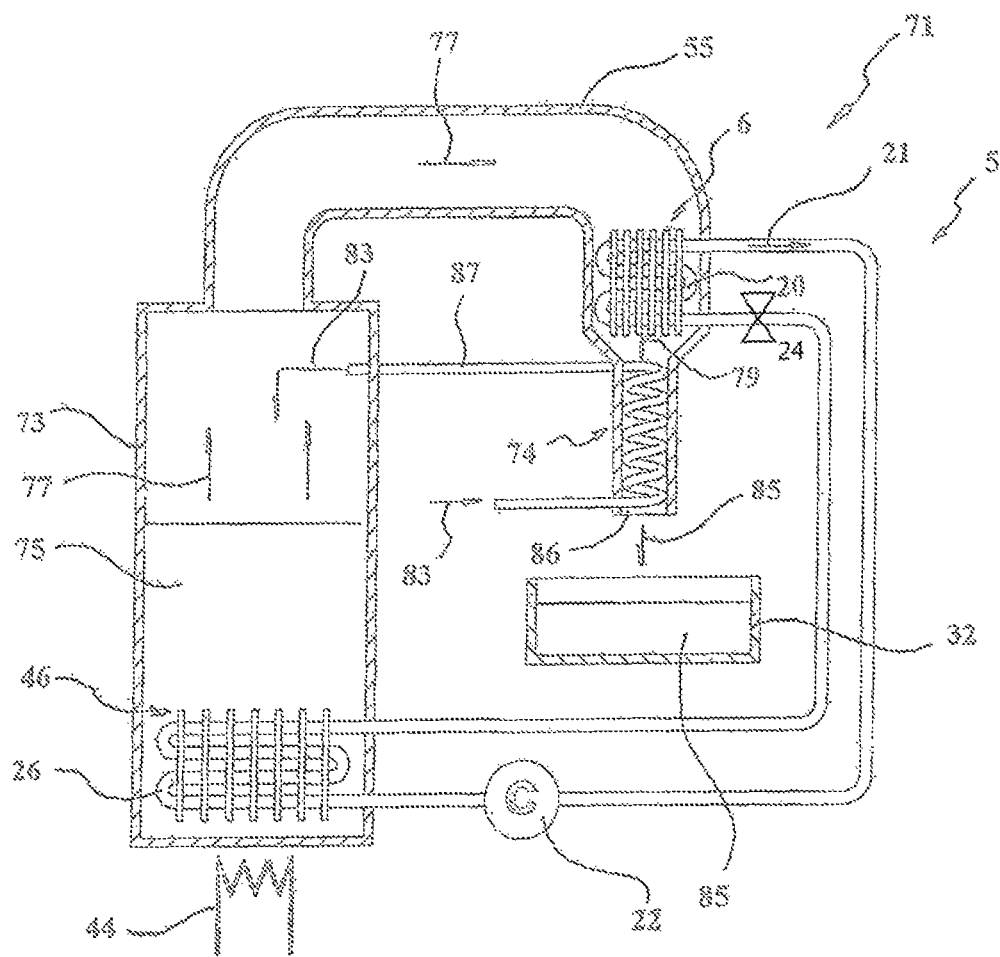
FIG. 6 is a schematic structural diagram of the third embodiment of the liquid heating apparatus according to the present invention illustrating when the liquid heating apparatus is applied to a situation such as a distilled water generating device or a distilling apparatus.

FIG. 6 shows a structure of a fourth embodiment of a liquid heating apparatus according to the present invention. A distilled water generating apparatus or a distilling apparatus is used as an example for description.

As shown in FIG. 6, the distilled water generating apparatus 71 includes a container 73, a heater 44, a heat pump 5, a first heat exchanger 6, a second heat exchanger 46, and a third heat exchanger 74. The container 73 is used to accommodate hydrous liquid 75. The heater 44 is disposed at the bottom or periphery of the container 73 for heating the hydrous liquid 75 in the container 73 until boiling, so as to generate vapor 77. A pipeline 55 is disposed above the container 73 for introducing the vapor 77 in to the first heat exchanger 6, so as to perform heat exchange with a working fluid 21 in an evaporator 20 of the heat pump 5. The heat pump 5 includes the evaporator 20, a compressor 22, a control valve 24, and a condenser 26. In this embodiment, the structure and working process of the heat pump 5 are the same as those of the first embodiment shown in FIG. 1, and detailed descriptions thereof are omitted herein. The second heat exchanger 46 is disposed in the hydrous liquid 75 of the container 73, and heat energy is transmitted to the hydrous liquid 75 in the container 73 through the second heat exchanger 46, so as to vaporize the hydrous liquid. Hot distilled water 79 condensed at the first heat exchanger 6 still contains high heat energy, and is then introduced into the third heat exchanger 74, so as to perform heat exchange with a liquid 83 having the same composition as the hydrous liquid 75 in the container 73. The cooled distilled water 85 flows out from outlet 86, and is stored in a storage 32 as back up. The liquid 83 heated up in the third heat exchanger 74 is injected into the container 73 through the pipeline 87 to serve as pre-heated distilling liquid, thereby reducing the power consumption of the heater 44.

In the above embodiment, for illustrative purpose, both the liquid and the working fluid could be water. However, it should be understood that the present invention is not limited thereto.

Figure 7:
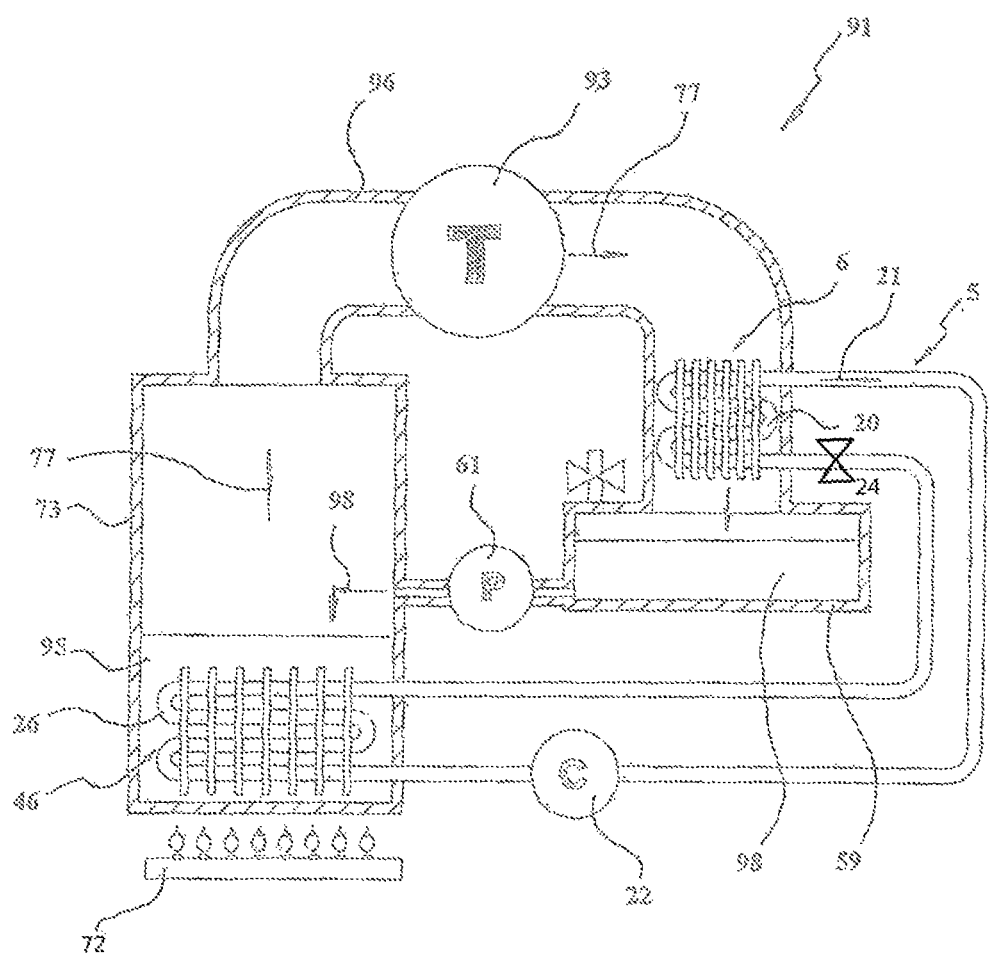
FIG. 7 is a schematic structural diagram of a fourth embodiment of a liquid heating apparatus according to the present invention illustrating when the liquid heating apparatus is applied to a situation such as a generating apparatus.

FIG. 7 shows a structure of a fifth embodiment of a liquid heating apparatus according to the present invention. A generating apparatus is used as an example for description.

As shown in FIG. 7, a generating apparatus 91 includes a container 73, a heater 72, a heat pump 5, a first heat exchanger 6, a second heat exchanger 46, and a generator 93. The container 73 is used to accommodate liquid 95, a pipeline 96 is disposed above the container 73, and the generator 93 is disposed in the middle of the pipeline 96. The heater 72 heats the liquid 95 in the container 73 until boiling to generate vapor 77. The vapor 77 is introduced through the pipeline 96 and pushes the generator (for example, a turbine) 93 to generate electric power or drive another apparatus. The vapor 77 enters the first heat exchanger 6 through the generator 93, so as to perform heat exchange with a working fluid 21 in an evaporator 20 of the heat pump 5. The heat pump 5 includes the evaporator 20, a compressor 22, a control valve 24, and a condenser 26. In this embodiment, the structure and working process of the heat pump 5 are approximately identical to the first embodiment shown in FIG. 1, and detailed descriptions thereof are omitted herein. The second heat exchanger 46 is disposed in the liquid 95 of the container 73, and heat energy is transmitted to the liquid 79 in the container 73 through the second heat exchanger 46, so as to vaporize the liquid. The working fluid 21 in the heat pump 5 is water, and the liquid 95 in the container 73 may be a liquid with much less latent heat of vaporation than that of water, such as alcohol propyl. By using alcohol propyl as an example, the boiling point of the alcohol propyl is similar to that of water, that is, about 97° C.; however, the latent heat of vaporation of the alcohol propyl is only 779 KJ/Kg, which is about 35% of the latent heat of water being 2250 KJ/Kg. Therefore, vaporization of every 35-kilogram water in the evaporator 20 can absorb latent heat released by condensation of 100 kilograms alcohol propyl vapour, which greatly reduces the work load of the heat pump 5, and increases the overall efficiency of the generating apparatus 91. The alcohol propyl vapor 77 is condensed into liquid alcohol propyl 98 in the first heat exchanger 6 and stored in the storage 59 while the liquid alcohol propyl 98 still remains with a high temperature. The storage 59 is in communication with the container 73 through a pump 61, so as to reintroduce the high-temperature liquid alcohol propyl 98 into the container 73, thereby reducing the consumption of alcohol propyl as well as power consumption.

The invention claimed is:

1. An energy transmission system for exchanging thermal energy between a first medium in a sealed loop and a second medium outside of the sealed loop, the energy transmission system comprising:

a compressor having a first end and a second end;

a control valve having a first end and a second end for controlling flow of the first medium in the sealed loop of the energy transmission system;

a first passageway extending from the first end of the compressor to the first end of the control valve, at least one portion of the first passageway configured to form a first heat exchanger such that the first medium flowing therein absorbs thermal energy;

a second passageway extending from the second end of the compressor to the second end of the control valve, at least one portion of the second passageway configured to form a second heat exchanger for releasing thermal energy of the first medium when flowing therein;

a first chamber for accommodating the second medium therein and configured such that, in use, at least one portion of the second medium is in thermal communication with the first medium in the second heat exchanger;

wherein the system is configured, in use, to vaporize the second medium in the first chamber and such that the first medium condenses as the first medium flows through the second heat exchanger and transfers thermal energy to the second medium, wherein the system is further configured, in use, to convey the vaporized second medium to pass through the first heat exchanger for transfer of thermal energy from the vaporized second medium to the first medium flowing through the first heat exchanger such that the second medium is condensed and the first medium is vaporized, and wherein the compressor is configured for changing pressure of at least one portion of the first medium in the first and second passageways such that pressure in at least one portion of the first passageway is different from pressure in at least one portion of the second passageway.

2. The energy transmission system according to claim 1, wherein the first medium is water.

3. The energy transmission system according to claim 1, wherein the compressor and the control valve are configured for maintaining the pressure of the first medium slightly above one standard atmosphere pressure within the second passageway and the pressure slightly below one standard atmosphere pressure within the first passageway.

4. The energy transmission system according to claim 1, wherein a boiling point of the second medium in the first chamber is slightly lower than a boiling point of the first medium in the second heat exchanger, and a boiling point of the second medium passing through the first heat exchanger is slightly higher than a boiling point of the first medium in the first heat exchanger.

5. The energy transmission system according to claim 4 further comprising a generator located between the first chamber and the first heat exchanger, the generator generating electricity by utilizing flow of the vaporized second medium from the first chamber to the first heat exchanger.

6. The energy transmission system according to claim 4 further comprising a third chamber removably located between the first chamber and the first heat exchanger, the third chamber configured for accommodating articles which exchange thermal energy with the second medium flowing therethrough.

7. The energy transmission system according to claim 6, wherein the third chamber comprises a sealing cover and at least one vessel, the sealing cover configured for sealingly covering the at least one vessel, the vessel comprising at least a first chamber and a second chamber, the first chamber comprising a bottom plate and partition wall surrounding the bottom plate, the bottom plate having a porous structure which allows the second medium to flow therethrough, the second chamber and the first chamber separated by the partition wall, the second chamber forms a passage for exporting the second medium.

8. The energy transmission system according to claim 4, further comprising:

a third heat exchanger connected to the first chamber via a third passageway;

wherein the condensed second medium passing through the first heat exchanger is configured to flow through the third heat exchanger;

and wherein the third passageway is configured to introduce the third medium into the first chamber after receiving thermal energy in the third heat exchanger.

9. The energy transmission system according to claim 4, further comprising:

a second chamber for receiving the condensed second medium after having passed through the first heat exchanger.

10. The energy transmission system according to claim 9, wherein the second chamber is connected with the first chamber and is configured to introduce the second medium into the first chamber.

11. The energy transmission system according to claim 1, further comprising:

a third heat exchanger connected to the first chamber via a third passageway and configured such that the condensed second medium in the first heat exchanger flows through the third heat exchanger so as to communicate thermal energy with a third medium in the third heat exchanger, wherein the system is configured to introduce the third medium into the first chamber after receiving thermal energy in the third heat exchanger.

12. The energy transmission system according to claim 1 further comprising:

a second chamber configured to receive the condensed second medium from the first heat exchanger.

13. The energy transmission system according to claim 12 wherein the second chamber is configured to introduce the received second medium into the first chamber.

* * * * *